United States Patent [19]

Bensadoun

[11] Patent Number: 4,510,483
[45] Date of Patent: Apr. 9, 1985

[54] LIQUID RHEOSTAT FOR STARTING AN ELECTRIC MOTOR WITH IMPROVED SILL STRUCTURE

[75] Inventor: Michel Bensadoun, Couzeix, France

[73] Assignee: Electricite de France Service National, Paris, France

[21] Appl. No.: 520,849

[22] Filed: Aug. 5, 1983

[30] Foreign Application Priority Data

Aug. 23, 1982 [FR] France ................................. 82 14474

[51] Int. Cl.³ .......................................... H01C 10/02
[52] U.S. Cl. .......................................... 338/80; 338/86; 338/94; 338/38; 338/195; 338/222; 137/576
[58] Field of Search ................. 338/80, 81, 86, 94, 338/195, 222, 27, 38; 137/573, 575, 576; 251/345

[56] References Cited

U.S. PATENT DOCUMENTS

| | | | |
|---|---|---|---|
| 1,203,610 | 11/1916 | Hall | 338/86 |
| 1,217,473 | 2/1917 | Mace | 338/86 |
| 1,309,802 | 7/1919 | Holthoff | 338/86 |
| 1,745,510 | 7/1925 | Seegar | 338/86 X |
| 1,966,804 | 7/1934 | Planche | 338/86 X |
| 2,855,545 | 10/1958 | Beyard | 338/222 X |
| 2,951,504 | 9/1960 | McBroom | 137/576 |
| 4,325,049 | 4/1982 | Bensadoun | 338/86 |

FOREIGN PATENT DOCUMENTS

| | | | |
|---|---|---|---|
| 343825 | 7/1927 | Belgium . | |
| 1790326 | 8/1976 | Fed. Rep. of Germany | 338/80 |
| 697871 | 1/1931 | France . | |
| 2395578 | 1/1979 | France . | |

OTHER PUBLICATIONS

Halter, "The Liquid Rheostat Returns", Allis Chalmers, Electrical Review First Quarter 1947, pp. 14–17.
Kivskik et al., "A Liquid Variable Resistor", *Instruments and Experimental Technique*, vol. 19, No. 2, pt. 2, Mar.-Apr. 1976, pp. 560–562.

Primary Examiner—Roy N. Envall, Jr.
Assistant Examiner—C. N. Sears
Attorney, Agent, or Firm—Charles A. Brown; Charles E. Brown

[57] ABSTRACT

A variable level liquid rheostat having a tubular overflow member between a starting chamber and a tank for controlling the level of electrolyte in the starting chamber. The overflow member has a closed upper end inside the starting chamber and lateral discharge orifices and communicates with the electrolyte in the tank. The overflow member produces a siphoning effect when the electrolyte level in the starting chamber is substantially above the discharge orifices for causing a sudden drop of the level in the starting chamber until the electrolyte level in the starting chamber again reaches the discharge.

13 Claims, 10 Drawing Figures

LIQUID RHEOSTAT FOR STARTING AN ELECTRIC MOTOR WITH IMPROVED SILL STRUCTURE

BACKGROUND OF THE INVENTION

This invention relates generally to variable-level liquid rheostats of the type currently used, for example, for starting electric motors, the starting of which necessitates the insertion, in the corresponding excitation circuit, of a resistance which, initially high, is required to decrease progressively as starting proceeds.

The invention may equally well be applied to the starting of stator-starting motors, and to the starting of rotor-starting motors, and particularly to the starting of short-circuit rotor motors.

Generally speaking, the variable-level liquid rheostats used for this purpose comprise as described for example in the French Patent filed on June 27, 1977 under Pat. No. 77 18915 and published under Pat. No. 2,395,578, a tank, which contains electrolyte, a starting chamber, which is arranged above said tank and in the upper part of which are arranged electrodes, connecting terminals adapted to link said electrodes with the excitation circuit of the motor to be started, and a feed pipe fitted between said tank and said starting chamber for the introduction of electrolyte into the latter.

Initially, only a minimal quantity of electrolyte is present in the starting chamber, and therefore only the lower portion of the electrodes is immersed.

As a result, the latter then introduce a high resistance into the excitation circuit of the motor to be started.

A progressive invasion of the starting chamber by electrolyte is effected during starting, by appropriate actuating means, and for example by a pump, so that an increasing section of the electrodes is progressively immersed, and thus short-circuited.

Since only the emergent part of these electrodes continues to insert a resistance into the excitation circuit of the motor to be started, this resistance therefore decreases progressively, as required.

At the end of the starting thus effected, which implies stability of the speed of the relevant motor, and hence stability of the current flowing in its excitation circuit, the electrodes are disconnected, either by a contact controlled by a float, or by a contact time-delayed for this purpose.

In practice, a vent is usually provided at the upper part of the starting chamber, which places the upper part of said starting chamber in communication with the upper part of the tank, to prevent any compression of the atmosphere in the starting chamber with the progressive invasion of the latter by electrolyte, and which, forming a discharge sill, may at least occasionally function as an overflow aperture for this electrolyte.

Although such variable-level liquid rheostates have given and may still give satisfaction, their use, at least in certain applications, may give rise to difficulties.

In fact, they do not hitherto permit convenient control of the increase in speed of motors during starting, or in other words, their acceleration process, nor afterwards their setting to nominal speed.

Dealing with stator-starting motors, the reason is that, according to at least apparently conflicting demands: that the increase in speed must be made very rapidly, which requires the use of actuating means adapted to ensure a considerable flow of the electrolyte from the tank into the starting chamber, and that, conjointly, after the previous increase in speed, a constant current must be maintained during the end of starting, which requires a stabilisation of the level reached by the electrolyte in the starting chamber.

Dealing with rotor-starting motors, the reason is likewise that although, in a first phase, the increase in speed of the motor during starting must again be made rapidly, it is desirable that, in a second phase, the rise of the electrolyte into the starting chamber should be slow to permit the motor to complete its attainment of speed.

The present invention relates generally speaking to an arrangement permitting these diverse requirements to be satisfied in particularly simple and efficacious manner, and therefore to permit the increase in speed of a motor during starting to be controlled with high certainty.

SUMMARY

More specifically, the present invention has as its object a variable-level liquid rheostat for starting an electric motor, of the type comprising a tank, which contains electrolyte, a starting chamber, which is arranged above said tank and in the upper part of which are arranged electrodes, connecting terminals adapted to link said electrodes with the excitation circuit of the motor to be started, a feed pipe fitted between said tank and said starting chamber for the introduction of electrolyte into the latter, and a discharge sill arranged in said starting chamber and adapted to limit, at least temporarily, the level of electrolyte therein, this liquid rheostat being characterised in that said discharge sill is mounted adjustably in height in the starting chamber under the control of an actuating means available to the user.

According to a preferred embodiment, the discharge sill is formed by at least one aperture, henceforth called discharge aperture, made laterally in a tube closed transversely towards the top above said discharge aperture, and said tube is directly or indirectly immersed in the electrolyte contained in the tank, so that it is capable of siphoning.

A tube thus capable of siphoning advantageously permits, for the required invasion by electrolyte of the starting chamber, the use of actuating means capable, as desired, of a substantial flow of electrolyte.

In fact, as soon as, its discharge sill being reached, it is totally invaded by electrolyte, it operates as a siphon, and its internal volume then being at negative pressure relative to the pressure prevailing in the tank, it also, as desired, effects a substantial return flow from the starting chamber into this tank, greater in any case than that of a simple overflow aperture of comparable passage cross-section.

In practice, above the discharge sill which this tube comprises, there is provided laterally on the latter at least one aperture of smaller passage cross-section, henceforth called a vacuum-breaker aperture.

In a first state, by the action of the associated actuating means, the level of electrolyte in the starting chamber exceeds both the discharge aperture or apertures and the vacuum breaker aperture or apertures.

But when, as above-mentioned, the siphon which the relevant tube then forms is primed, the level of electrolyte in the starting chamber falls until, the vacuum breaker aperture or apertures being uncovered again, such as siphon breaks down.

Thereupon the rise of the level of electrolyte in the starting chamber is resumed, and, the process being repeated cyclically, a very rapid stabilisation of this level at a mean level, chosen to be the desired level.

The liquid rheostat according to the invention is therefore perfectly suitable for starting a stator-starting electric motor.

But it is likewise perfectly suitable for starting a rotor-starting electric motor.

For this purpose, the tube used passes through the bottom of the starting chamber by virtue of a sleeve, which is fixed to said bottom, and in which it is mounted axially slidably and fluid-tightly under the control of the actuating means available to the user, and substantially at mid-height it has laterally at least one discharge aperture, which is normally masked by said sleeve, and which is unmasked when it is in the top position, then extending into the starting chamber.

For a rotor-starting motor, the tube may, for example, be placed in the top position, so that the discharge aperture or apertures which it has at mid height is or are then totally unmasked, at the base of the starting chamber, and so that the return flow of electrolyte which it or they permit(s) from this starting chamber to the tank is a function of the hydrostatic pressure of the column of liquid which surmounts it or them.

As this pressure increases progressively with the level of electrolyte in the starting chamber, the rise of the latter is therefore slowed down progressively, as desired, due to the increasing return flow of the electrolyte which results therefrom.

As a variant, the tube may, if desired, be placed in a position wherein the discharge aperture or apertures which it has at mid-height is or are only more or less unmasked, but not blocked, and therefore effect(s) only a more or less strong, but not zero, return flow.

It is thus possible according to the invention to effect mechanically, in an extremely simple manner, with great flexibility of adaptation, the desired type of starting for the relevant motor, with a linear or non-linear acceleration slope.

DESCRIPTION OF THE PREFERRED EMBODIMENTS

Figure 1:
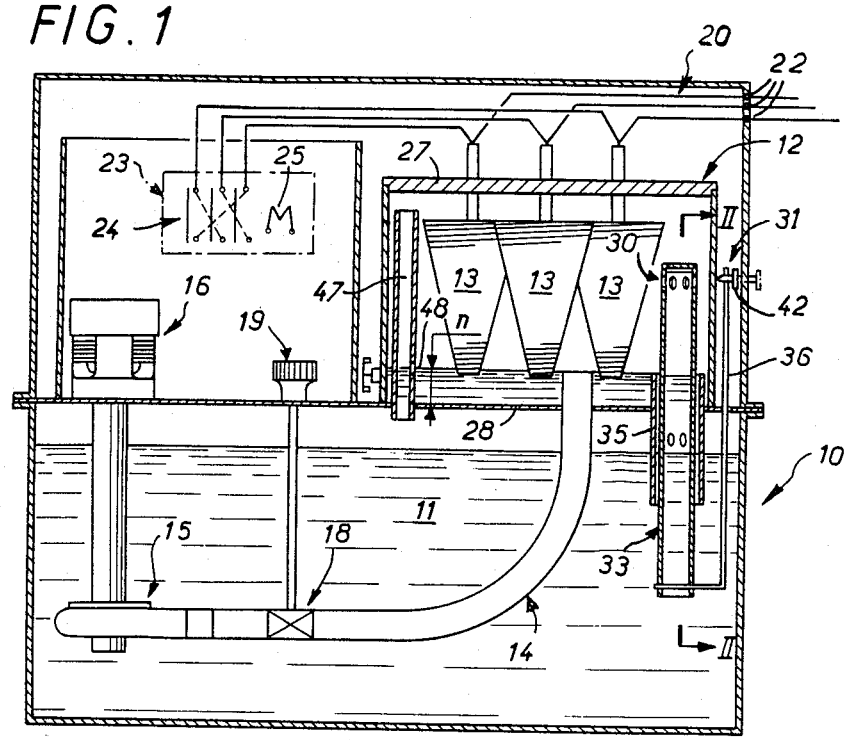
FIG. 1 is a view in sectional elevation of a variable-level liquid rheostat according to the invention.

As shown in the embodiments illustrated in the figures, and as described in the above-mentioned French Pat. No. 2,395,578, the variable-level liquid rheostat comprises, generally speaking, a tank 10, which contains electrolyte 11, a starting chamber 12, which is arranged above said tank 10, and in the upper part of which are arranged electrodes 13, suitably insulated from each other, and three in number in the embodiments illustrated, and a feed pipe 14, which is fitted between the tank 10 and the base of the starting chamber 12 for the introduction of electrolyte 11 into this starting chamber 12 under the control, on the one hand, of a submerged pump 15 driven by a motor 16, and on the other hand by a valve 18 subordinate to an actuating button 19 available to the user.

As customary, a wire system 20 connects the electrodes 13 to connecting terminals 22 adapted to effect their linking to the excitation circuit of the electric motor to be started.

Likewise in customary manner, a contactor block 23 adapted to disconnect the electrodes 13 is also provided.

In the embodiment illustrated, the contacts 24 of this contactor block 23 are operated for this purpose by a time-delayed relay 25.

In practice, the electrodes 13 hang vertically from a cover 27 closing the starting chamber 12, and the feed pipe 14 projects from the bottom 28 of the latter so that there always remains, in this starting chamber 12, a sufficient level of electrolyte for the lower portion of said electrodes 13 to be permanently immersed therein.

These arrangements are well known per se, and they will not be described in greater detail here.

Likewise in manner known per se, there is also provided at the upper part of the starting chamber 12 a discharge sill 30, adapted to limit at least temporarily the level of electrolyte in the latter.

The said discharge sill 30 is mounted adjustably in height in the starting chamber 12, under the control of an actuating means 31 available to the user.

In the embodiment illustrated in FIGS. 1 to 4, this discharge sill 30 is formed by at least one aperture 32, henceforth called discharge aperture, made laterally in a tube 33 closed transversely towards the top by a wall 34, above said discharge aperture 32, and, conjointly, said tube 33, henceforth called actuating tube, is directly or indirectly immersed in the electrolyte 11 contained in the tank 10, so that, as described in greater detail below, it is capable of siphoning.

In practice, in the embodiment illustrated in FIGS. 1 to 4, the actuating tube 33 passes through the bottom 28 of the starting chamber 12 by virtue of a sleeve 35, which is fixed to said bottom 28, and in which it is mounted axially slidably, and fluid-tightly, under the control of the actuating means 31 available to the user, and at its base it is directly immersed straight into the electrolyte 11 contained in the tank 10.

As illustrated, the actuating means 31 available to the user is formed simply by a bent rod 36, the horizontal part of which passes diametrally through the actuating tube 33, by virtue of two holes 37 provided for this purpose at the base of the latter, and the vertical part of which, after passing through an intermediate platform 39 prolonging the bottom 28 of the starting chamber 12 to close the tank 10, carries a control knob 42 adapted to effect its locking in position.

There may be, for example, a point screw cooperating for this purpose with the lateral wall of the starting chamber 12, as shown diagrammatically in FIG. 1.

As a variant, such a control knob 42 may simply be mounted adjustably in position in a snug hole made for this purpose in a flange fixed to the lateral wall of the starting chamber 12 or that of the housing 43 which, overlapping the height of the tank 10, protects conjointly the starting chamber 12 and the various constituents associated with the latter.

As illustrated by solid lines, the control knob 42 is arranged inside the housing 43.

As a variant, and as shown diagrammatically by dashed lines in FIG. 1, it may be arranged outside the same.

Be that as it may, it permits a regulation in the height of the actuating tube 33 in the starting chamber 12.

In practice, in the embodiment illustrated in FIGS. 1 to 4, the actuating tube 33 is provided with a plurality of discharge apertures 32, of relatively large passage cross-section, which, distributed circularly, are for example all provided at the same level, as illustrated.

In the embodiment illustrated, they are apertures of generally circular contour.

Above the discharge sill 30 formed by these discharge apertures 32, the actuating tube 33 is provided with at least one aperture of smaller passage cross-section 44, henceforth called the vacuum-breaker aperture.

In the embodiment illustrated, a plurality of vacuum-breaker apertures 44 are provided, in equal number to that of the discharge apertures 32, and alternating with the latter.

They are not illustrated in FIG. 1.

They are likewise, in this embodiment, apertures of circular contour.

Figure 4:
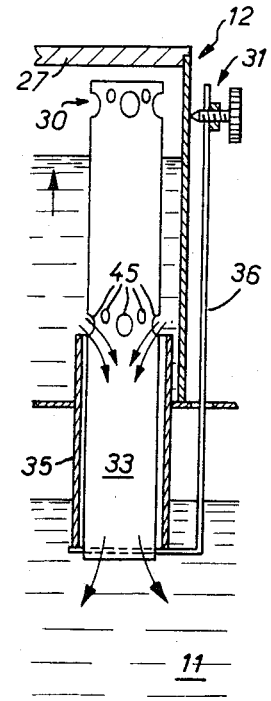
FIG. 4 is a similar view to that of FIGS. 3A, 3B, for starting a rotor-starting electric motor.
Figure 5:
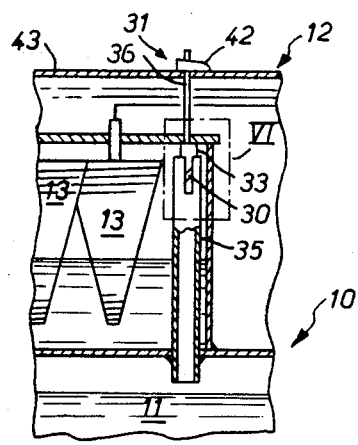
FIG. 5 is a partial view similar to that of FIG. 1, and relates to a variant of the embodiment.
Figure 6:
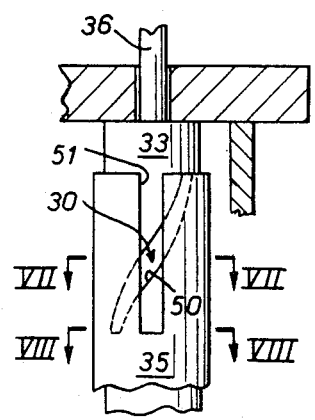
FIG. 6 shows, on a larger scale, the detail of FIG. 5 designated by framing in the latter.
Figure 7:
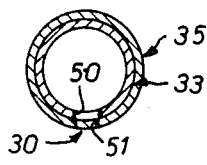
FIGS. 7, 8 are views in cross-section of the corresponding tube, along the lines VII—VII and VIII—VIII of FIG. 6 respectively.
Figure 8:
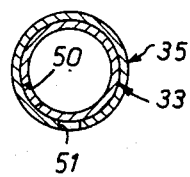

The actuating tube 33 is also provided laterally, at mid height, with at least one discharge aperture 45, which is normally masked by the sleeve 35 through which it passes, and which is unmasked when, as illustrated in FIG. 4, this actuating tube 33 is in the top position in the starting chamber 12.

In practice, in the embodiment illustrated in FIGS. 1 to 4, a plurality of discharge apertures 45 are provided, which are preferably distributed circularly, and which are for example provided at two different levels, as illustrated, the ones of smaller passage cross-section at a first level, and the others of larger passage cross-section at a second level.

Lastly, in the embodiments illustrated, a vent 47 is also provided, which places the upper part of the starting chamber 12 in communication with the upper part of the tank 10, in order to balance the corresponding atmospheres.

At the above-specified level n, the tube which in practice constitutes this vent 47 preferably has an aperture 48.

Figure 3A:
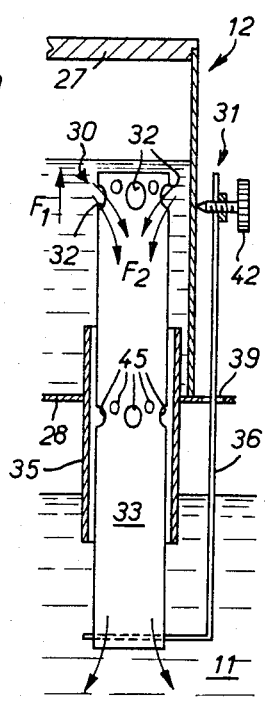
FIGS. 3A, 3B are views which illustrate the use of this tube for starting a stator-starting electric motor.
Figure 3B:
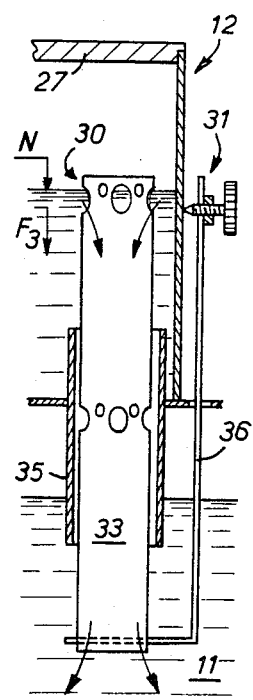

It will be assumed first of all, with reference to FIGS. 3A and 3B, that it is required to effect the starting of a stator-starting electric motor.

Under the control of the actuating means 31, the actuating tube 33 is arranged at a given level which, determined empirically during preliminary tests, is intermediate its bottom level and its top level. For the level thus chosen, the discharge apertures 45 which it has at mid-height are entirely masked by the sleeve 35 through which it passes, the length of the latter being made so that such discharge apertures 45 are actually unmasked only when, as above mentioned, and as illustrated in FIG. 4, the actuating tube 33 is in the top position.

The pump 15 being started, with appropriate throttling of its delivery under the control of the valve 18, there is a progressive transfer of electrolyte 11 from the tank 10 into the starting chamber 12, so that the level of electrolyte 11 in the latter rises, as represented by the arrow F1 in FIG. 3A.

When this level reaches the discharge apertures 32, there is set up through the latter, as represented by the arrows F2 in FIG. 3A, a return flow of the electrolyte 11 into the tank 10, through the actuating tube 33.

However, this return flow is smaller than the delivery of the pump, so that the level of electrolyte 11 in the starting chamber 12 continues to rise.

This is so until, totally invaded by electrolyte, the actuating tube 33 commences to operate as a siphon, since it is closed at the top by the transverse wall 34.

The internal volume of the tube 33 then being at negative pressure relative to the pressure in the tank 10, the return flow of the electrolyte 11 into the latter accelerates, the situation being as if a suction current were then established from the starting chamber 12 into said tank 10.

This results, first of all, in a slowing down of the rise of the electrolyte 11 in the starting chamber 12, then a reversal of the direction of change of this level, which, as symbolised by the arrow F3 in FIG. 3B, commences to fall.

As soon as the electrolyte 11 unmasks the vacuum breaker apertures 44, there is an immediate breakdown of the siphon hitherto formed by the actuating tube 33.

No longer assisted, in these conditions, by the previous negative pressure, the return flow of the electrolyte 11 into the tank 10 slows down abruptly, so that the level of electrolyte 11 in the starting chamber 12 commences to rise again.

An analogous process to the above-described is then repeated cyclically, and this results overall in the stabilisation of the electrolyte 11 in the starting chamber 12 at the level N, which is related to the position of the actuating tube 33 in this starting chamber 12, and which, from the above-mentioned preliminary tests, corresponds to the desired starting conditions for the relevant motor.

At the end of a time determined by the time-delayed relay 25, the electrodes 13 are disconnected by the contacts and conjointly the pump 16 is stopped.

Rapid drainage of the starting chamber 12 then occurs both by the pump 15, which then operates as a turbine, and through the aperture 48 of the vent 47, which, previously forming only a negligible leakage in view of the delivery of said pump, afterwards advantageously accelerates the drainage of the starting chamber 12.

In the case of starting a rotor-starting electric motor, the actuating tube 33 according to the invention is placed in the top position as illustrated in FIG. 4.

Its discharge apertures 45 then come into action.

As their delivery is proportional to the height of the column of liquid surmounting them, the invasion by electrolyte of the starting chamber 12 is slowed down progressively.

In practice, and as above-indicated, by an appropriate adjustment of the position of the actuating tube 33, the discharge apertures 45 of the latter may be more or less unmasked according to the type of starting required.

Figure 2:
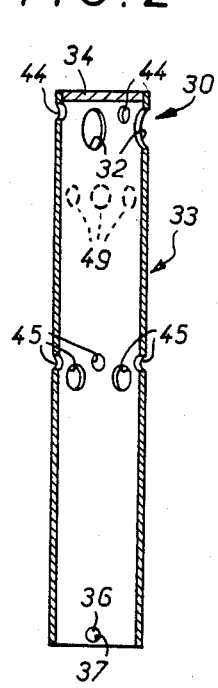
FIG. 2 is a view in axial section on a larger scale, and along the line II—II of FIG. 1, of a tube forming part of the rheostat, illustrated separately.

According to a variant of embodiment which is illustrated only schematically by dash lines in FIG. 2, holes 49, here called booster holes, of smaller cross-section than the apertures 32, 45, are provided below the discharge sill 30 formed by the apertures 32, between the latter and the discharge apertures 45.

Taking into consideration the passage cross-section which they present to the electrolyte, these booster holes 49 have practically no influence, during starting, upon the delivery of electrolyte to be effected by the pump 15 for the rise of electrolyte in the starting chamber 12.

However, in the course of this rise of the electrolyte, they advantageously effect progressive filling of the actuating tube 33 before the discharge sill 30 is reached.

Consequently they militate in favor of the obtention of an immediate stabilisation, at the correct level, of the electrolyte in the starting chamber 12, by instantaneous priming of the siphoning process as soon as the discharge sill 30 is reached.

The possible current peak due to this discharge sill 30 being passed is thus advantageously prevented.

In the variant of embodiment illustrated in FIGS. 5 to 8, the discharge sill 30 is formed by the conjunction of two mutually nested coaxial tubes 33 and 35, each of which contains a slot 50, 51 respectively, and at least one of which is mounted rotatably about the axis of the assembly under the control of the actuating means 31 available to the user; the slot 50, 51 of at least one of said tubes 33, 35 being generally oblique relative to said axis.

In practice, in the embodiment illustrated, it is the inner tube 33, henceforth called the actuating tube, as previously, which is attached to the actuating means 31 which is available to the user, and consists of a simple rod 36 which, passing through the upper part of the housing 43, carries beyond the latter a control knob 42.

Moreover, in the embodiment illustrated, the slot 50 exhibited by the actuating tube 33 is oblique, this slot 50 extending helically along a portion of the actuating tube 33, according to an angle of aperture equal to 180° for example.

In practice, the actuating tube 33 is, as previously, closed at the top part by a transverse wall, and it is to the latter that the rod 36 of the associated actuating means 31 is fixed.

Conjointly, in the embodiment illustrated, the outer tube 35 is, as previously, fixed to the bottom 28 of the starting chamber 12, and, likewise as previously, it constitutes, for the actuating tube 33, a sleeve in which the latter is mounted rotatably and fluid-tightly.

In the embodiment illustrated, the slots 51 exhibited by the outer tube or sleeve 35 is straight, and it therefore extends along a generatrix of the latter, for a portion of its height.

In the embodiment illustrated, the outer tube or sleeve 35 has, below the bottom 28 of the starting chamber 12, a limited extension, so that it is not immersed in the electrolyte 11 contained in the tank 10.

However, as a variant, it may equally well be immersed in this electrolyte 11, so that in such a case it is, indirectly, through its intermediary, that the actuating tube 33 then immerses into such an electrolyte 11.

In the embodiment of FIGS. 5 to 8 the discharge sill 30 is produced by the mutual intersection of the slots 50, 51, said discharge sill being formed by that portion of the oblique slot 50 which is located opposite the straight slot 51.

Depending upon the angular position of the actuating tube 33 in the outer tube or sleeve 35, the relevant portion of this slot 50 varies between its ends, which are arranged the one in proximity of the upper portion of the actuating tube 33 and the other in proximity of its lower portion.

Accordingly, depending upon the angular position of the actuating tube 33, and hence under the control of the associated actuating means 31, the discharge sill 30 varies in height along the slot 51 of the outer tube or sleeve 35, or in other words, as previously, this discharge sill 30 is thus regulable in height in the starting chamber 12, as required.

Figure 9:
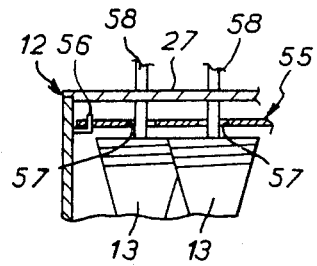
FIG. 9 is a view partly as shown in FIG. 1, and relates to another variant of the embodiment.

FIG. 9 relates to a variant of the embodiment which permits the advantageous improvement of the results obtained at the end of starting, particularly for large motors requiring a high current.

According to this variant of the embodiment, in the upper part of the starting chamber 12, the electrodes 13 are supported by the cover 27 of the latter and are insulated from this cover 27 said cover 27 being for example made of insulating material for this purpose. The electrodes 13 are surmounted by a plate 55 which is supported by the starting chamber 12, and with which, in the absence of electrolyte, they have no electrical connection whatsoever.

As illustrated, this plate 55 is housed on lugs 56 projecting from the internal wall of the starting chamber 12, and it is provided with apertures 57 adapted for the passage, with play, of the rod 58 by which the electrodes 13 are suspended from the cover 27.

When the cover 27 is set in place with the electrodes 13 and the sheet 55, the latter is positioned on the lugs 56 and thereupon retained and supported by the starting chamber 12 at a distance from the electrodes 13.

It therefore comes into action only for the purpose of starting, when, being reached by the electrolyte, and submerged by the latter, it becomes electrically connected to the electrodes 13 by said electrolyte; it then forms a short-circuit flange, thus reinforcing the short-circuit ring action already performed by the actual starting chamber 12.

The residual resistance in the excitation circuit of the relevant motor is thereby advantageously reduced.

This invention is not limited to the embodiments described and illustrated, but embraces all variants of execution and/or of combination thereof.

Particularly, if in the above, it was assumed for simplicity that the actuating means available to the user for the height regulation of the discharge sill used was manual, it is self-evident that such an actuating means may, if desired, be automated, particularly for a possible subordination as a function for example of a change of starting constants; such an actuating means may in this case, for example, be embodied by a jack, a miniature gear motor, or a cable and sheath transmission.

I claim:

1. A variable-level liquid rheostat for starting an electric motor, comprising a tank which contains electrolyte, a starting chamber which is arranged above said tank, electrodes arranged in the upper part of said starting chamber, connecting terminals adapted to link said electrodes with the excitation circuit of the motor to be started, a feed pipe fitted between said tank and said starting chamber for the introduction of electrolyte into said chamber, a discharge sill arranged in said starting chamber and adapted to limit, at least temporarily, the level of electrolyte therein, wherein said discharge sill is mounted adjustably in height in the starting chamber under the control of an actuating means available to the user, said discharge sill is formed by the conjuction of two mutually nested coaxial tubes which each contains a slot and of which at least one is mounted rotatably about the axis of the assembly under the control of the actuating means available to the user, and the slot of at least one of said tubes being generally oblique relative to said axis.

2. A liquid rheostat according to claim 1, wherein the inner tube is attached to the actuating means available to the user and is provided with an oblique slot, whereas the outer tube is fixed and is provided with a straight slot, and wherein said outer tube extends downwardly into the tank.

3. A liquid rheostat according to claim 2, wherein the inner tube is closed towards the top by a transverse wall, and the outer tube is immersed in the electrolyte contained in the tank.

4. A variable level liquid rheostat for starting an electric motor, said rheostat comprising a tank containing an electrolyte, a starting chamber arranged above said tank, electrodes arranged in the upper part of said starting chamber, connecting terminals adapted to connect said electrodes to an excitation circuit of a motor to be started, a feed pipe communicating between said tank and said starting chamber for supplying electrolyte to said starting chamber, a tubular overflow member arranged between said starting chamber and said tank to control the level of electrolyte in said starting chamber, said overflow member having a closed upper end inside said starting chamber and lateral discharge orifice means, and communicating with electrolyte in said tank, said overflow member defining siphoning means operative in response to an electrolyte level in said starting chamber substantially above said lateral discharge orifice for causing a sudden drop in the electrolyte level in said starting chamber until the electrolyte level in the starting chamber again reaches said discharge orifice means.

5. A liquid rheostat according to claim 4, wherein means are provided for adjustably mounting said overflow member in said starting chamber and controllable from outside said tank.

6. A liquid rheostat according to claim 4, wherein said discharge orifice means comprises a first plurality of discharge apertures of relative large flow section spaced around said tubular overflow member at the same level.

7. A liquid rheostat according to claim 4, wherein said discharge orifice means comprises at least one first discharge aperture and at least one vacuum breaker aperture of relatively small flow section compared with that of said first discharge aperture.

8. A liquid rheostat according to claim 7, wherein said discharge orifice means includes a plurality of first discharge aperture and vacuum breaker apertures and said vacuum breaker apertures alternating circumferentially with a plurality of said first discharge aperture.

9. A liquid rheostat according to claim 4, wherein a sleeve is provided in the bottom of said starting tube communicating opening into said starting chamber and said tank, said tubular overflow member being mounted for axial sliding movement in and in fluid-tight relation with said sleeve.

10. A liquid rheostat according to claim 9, wherein said tubular overflow member includes at least one other discharge aperture normally sealingly closed by said sleeve, and communicating with the interior of said starting chamber when said tubular overflow member is adjusted by said means for adjusting to its top position.

11. A liquid rheostat according to claim 4, wherein at least one booster hole is provided in said tubular overflow member below said discharge orifice means.

12. A liquid rheostat according to claim 10, wherein at least one booster hole is provided in said tubular overflow member between said discharge orifice means and said other discharge aperture.

13. A liquid rheostat according to claim 4, wherein said electrodes are surmounted by a metal plate carried by starting chamber, said electrodes not being in electrical contact with said plate in the absence of electrolyte.

* * * * *